US009600895B2

(12) United States Patent
Koceski et al.

(10) Patent No.: US 9,600,895 B2
(45) Date of Patent: Mar. 21, 2017

(54) SYSTEM AND METHOD FOR THREE-DIMENSIONAL NERVE SEGMENTATION USING MAGNETIC RESONANCE IMAGING

(71) Applicants: Saso Koceski, Skopje (MK); Filip Shteriev, Skopje (MK); Domenico Ciambrone, L'Aquila (IT); Lionel Lenkinski, Ontario (CA); Robert Lenkinski, Dallas, TX (US)

(72) Inventors: Saso Koceski, Skopje (MK); Filip Shteriev, Skopje (MK); Domenico Ciambrone, L'Aquila (IT); Lionel Lenkinski, Ontario (CA); Robert Lenkinski, Dallas, TX (US)

( * ) Notice: Subject to any disclaimer, the term of this patent is extended or adjusted under 35 U.S.C. 154(b) by 0 days.

(21) Appl. No.: 14/204,870

(22) Filed: Mar. 11, 2014

(65) Prior Publication Data
US 2014/0328529 A1    Nov. 6, 2014

Related U.S. Application Data

(60) Provisional application No. 61/818,668, filed on May 2, 2013, provisional application No. 61/923,013, filed on Jan. 2, 2014.

(51) Int. Cl.
*G06K 9/00* (2006.01)
*G06T 7/00* (2006.01)

(52) U.S. Cl.
CPC .......... *G06T 7/0097* (2013.01); *G06T 7/0081* (2013.01); *G06T 7/0083* (2013.01);
(Continued)

(58) Field of Classification Search
CPC .................. G06T 2207/30004; G06T 7/0097
See application file for complete search history.

(56) References Cited

U.S. PATENT DOCUMENTS

| 8,699,774 B2 * | 4/2014 | Yonezawa | G06T 7/0012 382/131 |
| 8,811,745 B2 * | 8/2014 | Farsiu | A61B 5/0066 382/128 |

(Continued)

OTHER PUBLICATIONS

Dalca (NPL: "Segmentation of Nerve Bundles and Ganglia in Spine MRI using Particle Filters" MIT Publication, Thesis Paper, May 23, 2012).*

(Continued)

*Primary Examiner* — Oneal R Mistry
(74) *Attorney, Agent, or Firm* — Quarles & Brady, LLP (57) ABSTRACT

Systems and methods for segmenting a nerve in a three-dimensional image volume obtained with a magnetic resonance imaging ("MRI") system are provided. A three-dimensional image volume that depicts a nerve and surrounding anatomical structures is provided and from that image volume the nerve is segmented. At least one control point is selected as a point in the image volume that is associated with the nerve. The three-dimensional volume corresponding to the nerve is then generated by propagating the three-dimensional volume outward from the selected at least one control point and through the image volume. The extracted three-dimensional volume corresponding to the nerve can be displayed while selectively displaying the surrounding anatomical structures.

15 Claims, 6 Drawing Sheets

(52) U.S. Cl.
CPC ............... *G06T 2207/10016* (2013.01); *G06T 2207/10088* (2013.01); *G06T 2207/20101* (2013.01); *G06T 2207/20141* (2013.01); *G06T 2207/20148* (2013.01); *G06T 2207/30004* (2013.01)

(56) References Cited

U.S. PATENT DOCUMENTS

| | | | |
|---|---|---|---|
| 2004/0249270 | A1* | 12/2004 | Kondo et al. ................. 600/425 |
| 2010/0135561 | A1* | 6/2010 | Moulik ........................ 382/131 |
| 2011/0150274 | A1* | 6/2011 | Patwardhan et al. ......... 382/103 |
| 2012/0330140 | A1* | 12/2012 | Yonezawa ............ A61B 3/1225 600/425 |

OTHER PUBLICATIONS

Chhabra, et al., MR Neurography: Advances, Radiology Research and Practice, vol. 2013, Article ID 809568, 14 pages.

Douglas, et al., Algorithms for the Reduction of the Number of Points Required to Represent a Digitized Line or Its Caricature, The Canadian Cartographer, 1973, 10(2):112-122.

Zadicario, et al., Boundary Snapping for Robust Image Cutouts, IEEE Conference on Computer Vision and Pattern Recognition, 2008, pp. 1-8.

* cited by examiner

SYSTEM AND METHOD FOR THREE-DIMENSIONAL NERVE SEGMENTATION USING MAGNETIC RESONANCE IMAGING

CROSS-REFERENCE TO RELATED APPLICATIONS

This application claims the benefit of U.S. Provisional Patent Application Ser. No. 61/818,668, filed on May 2, 2013, and entitled "SYSTEM AND METHOD FOR THREE-DIMENSIONAL NERVE SEGMENTATION USING MAGNETIC RESONANCE IMAGING," and of U.S. Provisional Patent Application Ser. No. 61/923,013, filed on Jan. 7, 2014, and entitled "SYSTEM AND METHOD FOR THREE-DIMENSIONAL NERVE SEGMENTATION USING MAGNETIC RESONANCE IMAGING," both of which are herein incorporated by reference in their entirety.

BACKGROUND OF THE INVENTION

The field of the invention is systems and methods for the segmentation of anatomy in medical images. More particularly, the invention relates to systems and methods for nerve segmentation in images acquired with magnetic resonance imaging ("MRI").

Nerve segmentation is an attractive clinical goal because allowing clinicians to accurately and non-invasively visualize the three-dimensional structure of a nerve can improve surgical planning and guidance, as well as improve treatment and diagnosis of pathologies associated with a nerve.

Region-growing techniques have been used to segment blood vessels; however, these methods are not adequate for segmenting anatomical structures, such as nerves, that may have low contrast in relation to the surrounding anatomical features.

Active contouring techniques can overcome some of the difficulties with region-growing, and have been implemented for segmenting blood vessels; however, these methods must be properly initialized and still suffer from lower reliability in low contrast areas of an image.

It would therefore be desirable to provide a method for segmenting a three-dimensional volume associated with a nerve that is fast and robust to the unique image contrasts associated with nerve images.

SUMMARY OF THE INVENTION

The present invention overcomes the aforementioned drawbacks by providing systems and methods for segmenting a nerve from a three-dimensional image volume obtained with magnetic resonance imaging ("MRI") using a technique that is fast and accurate, even when operating with lower image contrasts often attributable to nerve imaging.

It is an aspect of the invention to provide a method for segmenting a nerve in a three-dimensional image volume obtained with an MRI system. A three-dimensional image volume that depicts the nerve and surrounding anatomical structures in a series of contiguous image slices is provided. At least one control point is selected in the image volume. An axis that extends from the at least one control point along a longitudinal direction through the nerve, thereby defining an axis of the nerve, is then estimated. At least two cross sections, each cross section defining a cross-sectional area of the nerve in a plane perpendicular to the generated axis of the nerve, are then estimated. Additional cross sections are then generated between those at least two cross sections, thereby forming a volume that defines the nerve segmented from the surrounding anatomical structures.

It is another aspect of the invention to provide a method for segmenting a nerve in a three-dimensional image volume obtained with an MRI system. A three-dimensional image volume that depicts a nerve and surrounding anatomical structures is provided. At least one control point is selected in the image volume as a point that is associated with the nerve. A three-dimensional volume corresponding to the nerve is generated by propagating the three-dimensional volume outward from the selected at least one control point and through the image volume. The generated three-dimensional volume corresponding to the nerve is displayed while selectively displaying the surrounding anatomical structures.

The foregoing and other aspects and advantages of the invention will appear from the following description. In the description, reference is made to the accompanying drawings which form a part hereof, and in which there is shown by way of illustration a preferred embodiment of the invention. Such embodiment does not necessarily represent the full scope of the invention, however, and reference is made therefore to the claims and herein for interpreting the scope of the invention.

DETAILED DESCRIPTION OF THE INVENTION

Described here are systems and methods for segmenting a nerve from a three-dimensional image volume obtained with a magnetic resonance imaging ("MRI") system. The nerve volume created with the method of the present invention can thus be displayed visually in three-dimensions, thereby allowing viewing of the nerve, in isolation or selectively overlaid with the surrounding anatomy, from any angle. The nerve volume can also be compared to series of image volumes acquired at differing time points to establish four-dimensional capabilities.

Figure 1:
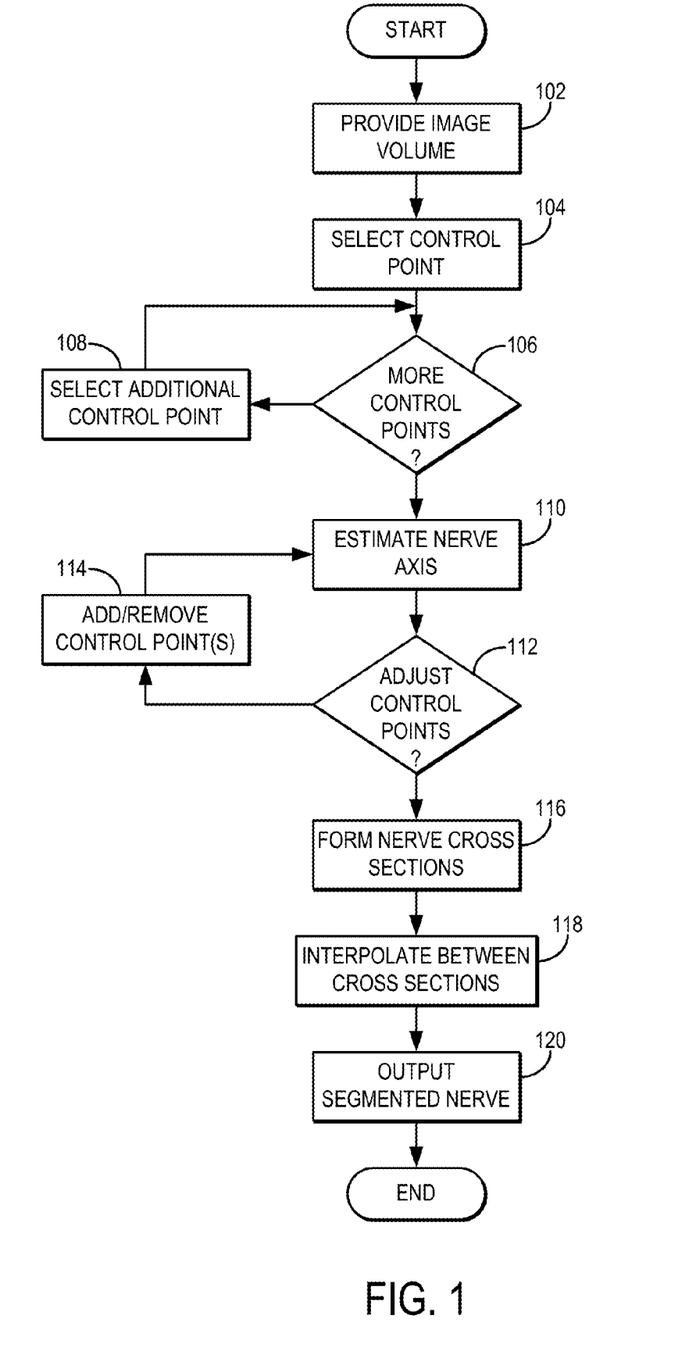
FIG. 1 is a flowchart setting forth the steps of an example of a method for segmenting a nerve from a three-dimensional image volume obtained with an MRI system in accordance with the present invention.

Referring to FIG. 1, a flowchart setting forth the steps of an example of a method for segmenting a nerve from a three-dimensional image volume obtained with an MRI system is illustrated. The method begins by providing a three-dimensional image volume that depicts at least one nerve and anatomical structures surrounding the at least one nerve, as indicated at step 102. By way of example, such an image volume may contain a plurality of contiguous two-dimensional images that depict the nerve and surrounding anatomical structures. The two-dimensional images are preferably oriented in a plane that is transverse or substantially transverse to the nerve.

After the image volume is provided, the user can view the image volume in a full screen or spit screen (2D and 3D) display. This display allows the user to scroll through and identify appropriate slices where the nerve being studied is clearly visible. In doing so, the user can identify where to start the segmentation mask process.

Figure 2:
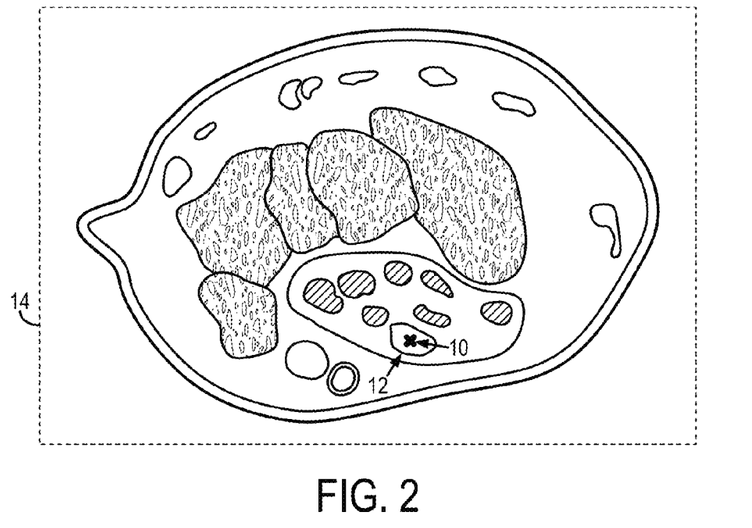
FIG. 2 is a pictorial representation of an example of a two-dimensional magnetic resonance image of a wrist depicting a median nerve, and illustrating a selection of a control point in the image.

In the provided image volume, a control point is selected, as indicated at step 104. The selected control point is selected as a point associated with the nerve to be segmented. For instance, as illustrated in FIG. 2, the control point 10 can be selected as a point lying in a nerve 12, such as the medial nerve, ulnar nerve, sciatic nerve, a nerve located in the brachial plexus, and so on. The control point 10 is selected in an image plane 14, which may be depict axial slice through the subject, for example. The image plane 14 may form a part of a three-dimensional image volume, or may be one of a series of contiguous two-dimensional images that collectively form an image volume. Preferably, the control point 10 is selected to be close to the center of the nerve 12 as it is viewed in the image plane 14. For this step, multiple views of the image volume can be presented to the user. For example, axial, coronal, and sagittal views where the nerve can be observed are displayed to the user.

Figure 3:
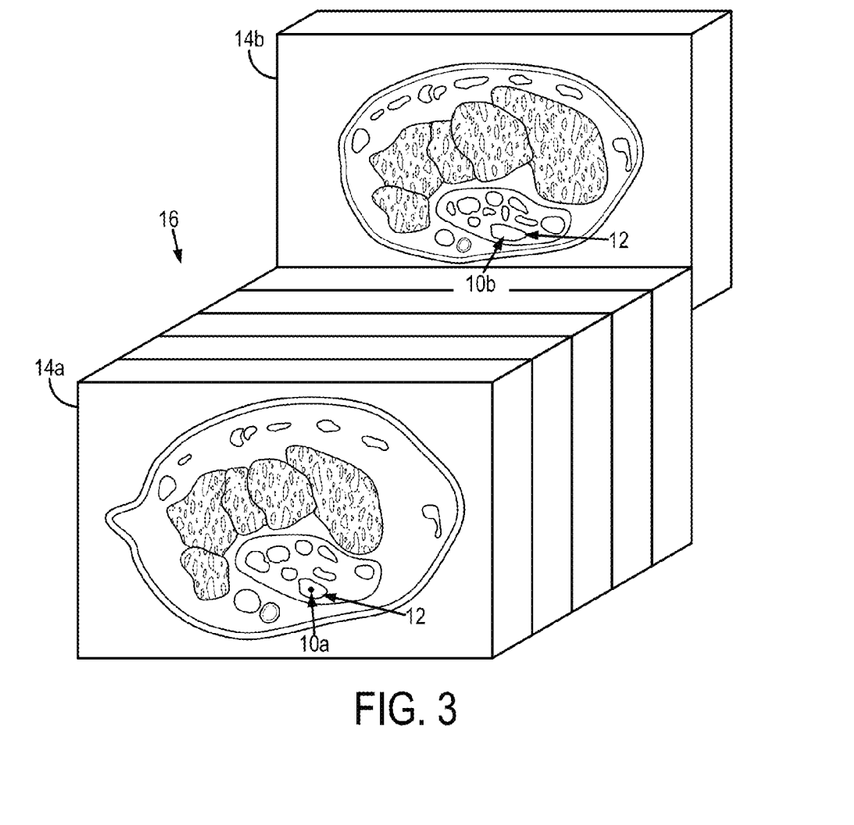
FIG. 3 is a pictorial representation of an example of a three-dimensional image volume containing a series of contiguous slices that each depict a portion of a wrist, and illustrating the selection of two control point in two different portion of the image volume.

Referring again to FIG. 1, more than one control point can be selected, as indicated at decision block 106. When additional control points are desired, one or more such additional control points are selected, as indicated at step 108. By way of example, two control points may be selected, with additional control points being selected depending on the overall curvature of the nerve being segmented. In general, the more control points that are selected, the more faithful that the initial estimation of the nerve axis will be, albeit at the cost of additional computational time. The additional control points are preferably selected in different portions of the image volume, preferably along the direction that the nerve extends through the image volume. In the example illustrated in FIG. 3, a first control point 10a is selected in a first image plane 14a as a point lying in the nerve 12. A second control point 10b is also selected in a second image plane 14b as a point also lying in the nerve 12. The image planes 14a, 14b belong to the same image volume 16, either as different parts of the image volume, or as different two-dimensional images in a series of such contiguous images that collectively form an image volume. In this example, the first control points 14a, 14b correspond to end points of the nerve in the image volume 16.

Referring again to FIG. 1, after at least one control point has been selected, an estimation of an axis extending along the nerve is made, as indicated at step 110. The axis that extends along the nerve, or "nerve axis," can be estimated using an algorithm that computes a line or curve, such as a cubic spline, between two control points.

By way of example, the nerve axis can be estimated by computing a three-dimensional Hermit, or natural, cubic spline between each pair of control points. A cubic spline is a spline constructed of piecewise third-order polynomials that pass through a set of M control points. The second derivative of each polynomial is commonly set to zero at the endpoints to provide a boundary condition that completes a system of M−2 equations. This produces a so-called "natural" cubic spline and leads to a simple tridiagonal system that can be solved easily to give the coefficients of the polynomials. It will be appreciated, however, that other boundary conditions can be used instead of setting the second derivative of each polynomial to zero at the end points. The formation of the nerve axis using this cubic spline approach is generally carried out as follows.

Let the $i^{th}$ piece of the spline be represented by, $$Y_i(t)=a_i+b_it+c_it^2+d_it^3 \quad (1);$$

where t is a parameter where $t \in [0,1]$, and $i=n-1$. Then, $$Y_i(0)=y_i=a_i \quad (2);$$

$$Y_i(1)=y_{i+1}=a_i+b_i+c_i+d_i \quad (3).$$

Taking the derivative of $y_i(t)$ with respect to the parameter, t, in each interval then gives, $$Y_i'(0)=D_i=b_i \quad (4);$$

$$Y_i'(1)=D_{i+1}=b_i+2c_i+3d_i \quad (5).$$

Solving Eqns. (2)-(5) for the parameters $a_i$, $b_i$, $c_i$, and $d_i$ gives the following solutions:

$$a_i=y_i \quad (6);$$

$$b_i=D_i \quad (7);$$

$$c_i=3(y_{i+1}-y_i)-2D_i-D_{i+1} \quad (8);$$

$$d_i=(y_i-y_{i+1})+D_i+D_{i+1} \quad (9);$$

Requiring that the second derivatives of Eqn. (1) also match at the points results in, $$Y_{i-1}(1)=y_i \quad (10);$$

$$Y_{i-1}'(1)=Y_i'(0) \quad (11);$$

$$Y_{i-1}''(1)=Y_i''(0) \quad (12);$$

$$Y_i(0)=y_i \quad (13);$$

for interior points, and $$Y_0(0)=y_0 \quad (14);$$

$$Y_{n-1}(1)=y_n \quad (15);$$

for endpoints. This gives a total of 4(n−1)+2=4n−2 equations for the 4n unknowns. As noted above, to obtain two or more conditions, the second derivatives of Eqn. (1) at the endpoints can be set to zero, $$Y_0''(0)=0 \qquad (16);$$

$$Y_{n-1}''(1)=0 \qquad (17).$$

Rearranging these equations results in the following symmetric tridiagonal system of equations:

$$\begin{bmatrix} 2 & 1 & & & & & \\ 1 & 4 & 1 & & & & \\ & 1 & 4 & 1 & & & \\ & & 1 & 4 & 1 & & \\ \vdots & \ddots & \ddots & \ddots & \ddots & \ddots & \vdots \\ & & & & 1 & 4 & 1 \\ & & & & & 1 & 2 \end{bmatrix} \begin{bmatrix} D_0 \\ D_1 \\ D_2 \\ D_3 \\ \vdots \\ D_{n-1} \\ D_n \end{bmatrix} = \begin{bmatrix} 3(y_1 - y_0) \\ 3(y_2 - y_0) \\ 3(y_3 - y_1) \\ \vdots \\ 3(y_{n-1} - y_{n-3}) \\ 3(y_n - y_{n-2}) \\ 3(y_n - y_{n-1}) \end{bmatrix}. \qquad (18)$$

Figure 4:
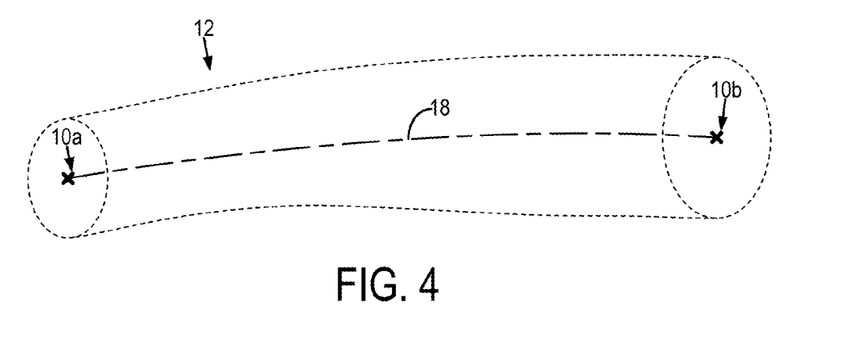
FIG. 4 is a pictorial representation of a nerve axis estimated between two control points.

The system of equations in Eqn. (18) can thus be solved to produce an estimate of the nerve axis. FIG. 4 illustrates an example of a nerve axis 18 that is estimated for a nerve 12. In this example, two control points 10a, 10b were selected and the nerve axis 18 was computed between those two points as described above.

A multi-planar reformatting ("MPR") feature can be implemented to allow the user to view the selected control points and the estimated nerve axis overlaid on an MPR view of the image volume. It can be advantageous to view the control points and the estimated nerve axis overlaid on the image volume to assess the accuracy of the estimated nerve axis before the segmented nerve volume is created. This allows the user to examine the full course of the nerve as it travels through the anatomic planes.

Referring again to FIG. 1, as indicated at decision block 112, the user can optionally adjust the control points after the nerve axis has been estimated. When adjustment of the control points is desired, the control points are adjusted by the user, as indicated at step 114. For instance, an additional control point can be inserted if the traced curve does not follow the nerve well. Similarly, some of the already inserted control points can be deleted. In both cases, the piece-wise three-dimensional curve representing the nerve axis is recomputed at step 110 following the selected change.

Figure 5:
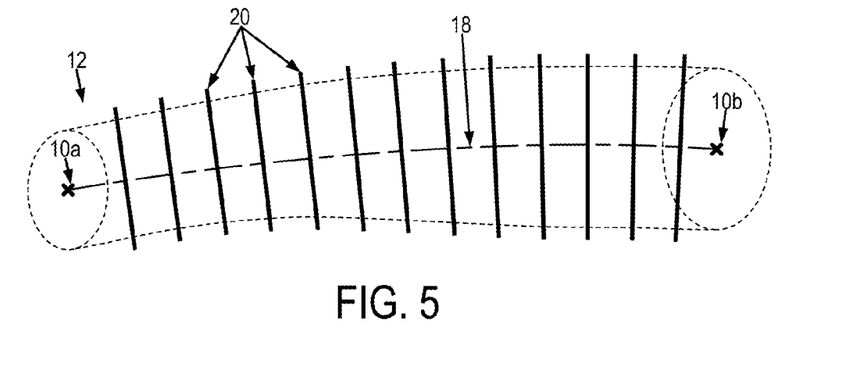
FIG. 5 is a pictorial representation of a plurality of cross-section planes formed along and perpendicular to an estimated nerve axis.

Once the nerve axis is estimated, the tubular structure that describes or otherwise corresponds to the nerve is generated so that the nerve can be segmented from the image volume. This is achieved by first estimating the outer surface of the nerve in a series of two-dimensional cross-sectional planes along the nerve axis, as indicated at step 116. First, cross sections that are perpendicular to the estimated nerve axis are constructed. As illustrated in FIG. 5, and by way of example, the cross sections 20 can be constructed at equidistant intervals along the nerve axis 18.

The cross sections are estimated using, in part, a hypothesis that the nerve should change its shape on the cross sections where it is bending. This hypothesis may be mathematically defined using the following equation:

$$R_C > R_{th} \qquad (19);$$

where $R_C$ is the curvature of the traced spline, f(x), of the nerve axis passing through the nerve's center, and is defined as, $$R_C = (1+f'(x)^2)^{-3/2} \qquad (20).$$

Cross sections that satisfy the condition in Eqn. (19) are estimated as the cross sections at which the contour of the outer surface of the nerve will be estimated.

Using these cross sections, arbitrary views of the image volume can be generated and displayed to the user. For example, an arbitrary unit vector lying in a particular cross-sectional place can be selected and used to define the direction of one side of a rectangular view. The direction of the cross product between this arbitrary unit vector and a normalized plane normal vector will then define the direction of the other side of the rectangular view.

The image defined by this rectangle in the image volume space can be calculated using a ray casting method. This image can then be displayed to the user as the desired arbitrary view. By changing the selected cross section along the nerve axis, or nerve path, the rectangular view can by synchronously updated to display the appropriate arbitrary view associated with the updated cross-sectional plane selection.

The outer surface of the nerve is estimated for each of the identified cross-sectional planes. This process can be performed automatically, or, the outer surface of the nerve can be identified by the user, who can select points corresponding to the nerve's outer surface in each cross-sectional plane. It is noted that the user may choose some cross sections where the nerve will be manually marked because this may improve the accuracy of the resulting segmentation in some instances. For example, the user may mark those cross sections where it appears that the nerve changes the form of its shape drastically.

When the user selects points on the surface of the nerve, the contour of the nerve surface can be estimated similar to the estimation of the nerve axis using Eqn. (18) to interpolate cubic splines between the user selected points. Because the anatomy in this case should be represented as a closed curve, however, Eqn. (18) is modified to account for the closed curve as follows:

$$\begin{bmatrix} 4 & 1 & & & & & 1 \\ 1 & 4 & 1 & & & & \\ & 1 & 4 & 1 & & & \\ & & 1 & 4 & 1 & & \\ \vdots & \ddots & \ddots & \ddots & \ddots & \ddots & \vdots \\ & & & & 1 & 4 & 1 \\ 1 & & & & & 1 & 4 \end{bmatrix} \begin{bmatrix} D_0 \\ D_1 \\ D_2 \\ D_3 \\ \vdots \\ D_{n-1} \\ D_n \end{bmatrix} = \begin{bmatrix} 3(y_1 - y_n) \\ 3(y_2 - y_0) \\ 3(y_3 - y_1) \\ \vdots \\ 3(y_{n-1} - y_{n-3}) \\ 3(y_n - y_{n-2}) \\ 3(y_0 - y_{n-1}) \end{bmatrix}. \qquad (21)$$

In some embodiments, the outer surface of the nerve can be estimated as follows. First, a center point for each cross section is selected. Preferably, the center point is selected to be near the geometrical center of the nerve in that cross section. As an example, the center point is selected as the intersection of the cross section with the nerve axis. Around this center point, a square sub-region is formed. As an example, the square sub-region may be a 5×5 square of pixels centered on the selected center point.

Assuming that this square sub-region lies entirely within the nerve, the median value of the pixels contained in the sub-region is calculated. Then, all of the pixels starting from the center point and extending radially outwards that are both within a certain distance of the center point and that have values within a certain threshold value of the median value are selected. For instance, the threshold value can be a certain percentage of the median value. As an example of the distance criterion, only those pixels that are within 1-8 mm of the center point can be selected because the diameter of the peripheral nerves roughly varies between 2-15 mm.

A connected component labeling and merging procedure can then be performed to generate a binary mask based on selected pixels. The outer contour of this binary mask is then interpolated to generate the outer surface of the nerve. For instance, the interpolation can include using natural cubic splines between the vertices of the polygon.

Because this technique for estimating the outer surface of the nerve can result in a curve with a large number of control points, it may be desirable to reduce the number of points in the estimated curve. As an example, the algorithm described by David Douglas and Thomas Peucker in "Algorithms for the Reduction of the Number of Points Required to Represent a Digitized Line or its Caricature," *The Canadian Cartographer*, 1973; 10(2):112-122 can be used to simplify the obtained piecewise linear curve.

Figure 6:
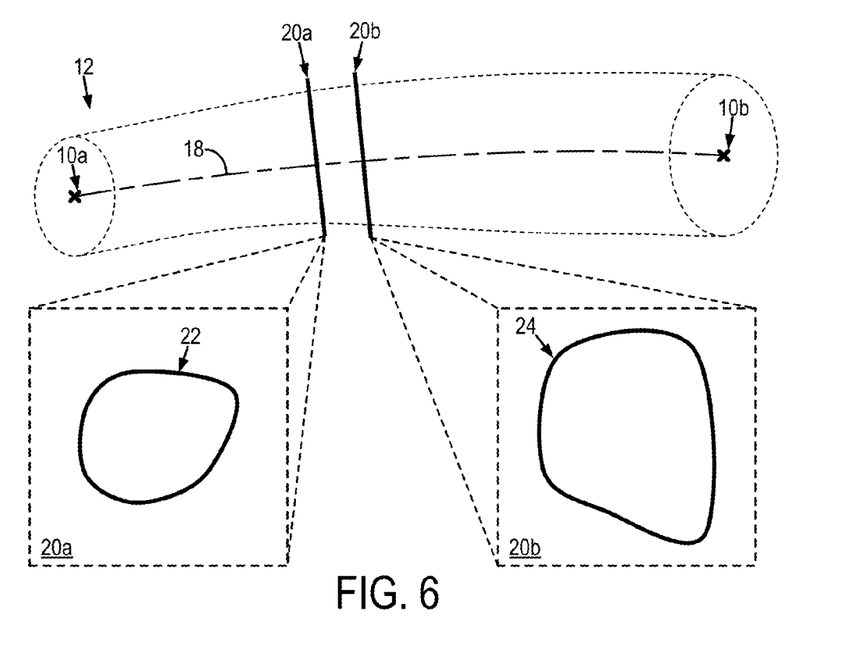
FIG. 6 is a pictorial representation of surface contours of a nerve estimated at two cross-sectional planes formed along and perpendicular to an estimated nerve axis.

After the nerve cross sections are estimated, they are interpolated between to form the tubular volume of the nerve, as indicated at step 118. This interpolation can be achieved, for example, using an active morphing technique. As illustrated in FIG. 6, in this step, interpolation is performed between two planar shapes 22, 24 that are marked in two cross sectional planes 20a, 20b that are perpendicular to the nerve axis 18, but are not necessarily parallel to each other.

Figure 7:
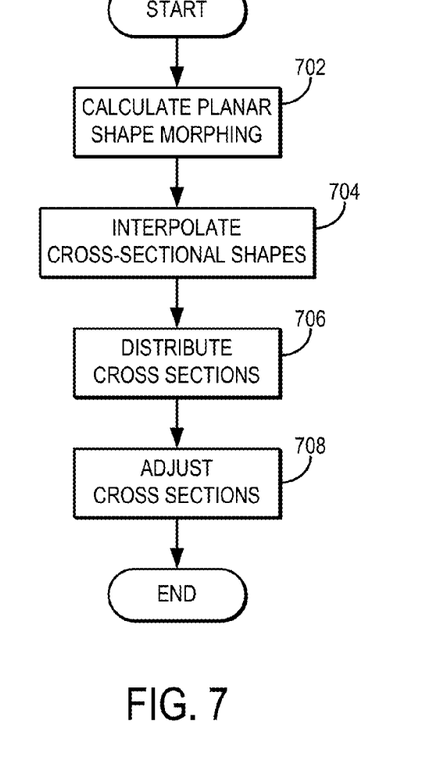
FIG. 7 is a flowchart setting forth the steps of an example of a method for generating a nerve volume from a series of two-dimensional nerve surface contours estimated at a respective plurality of cross-sectional planes formed along and perpendicular to an estimated nerve axis.

With reference now to FIG. 7, a flowchart setting forth the steps of an example of a method for interpolating between two nerve contours in two different cross-sectional planes is illustrated. The method begins by calculating the planar shape morphing for each contour, as illustrated at step 702. In this step, the areas of the shapes that are similar in the source shape (e.g., planar shape 22 in FIG. 6) and the target shape (e.g., planar shape 24 in FIG. 6) are identified and matched to each other. For this purpose, the source and target shapes are sampled with a set of equally spaced points, thereby producing two piecewise linear curves. The first sub-problem is to find the correspondence between these two curves. Without loss of generality, it could be assumed that the source and target shapes have been sampled with n and m points, $P_i^S$ with (i=1,..., n) and $P_j^T$ with (j=1,..., m), and where n≥m. For each point, regardless of whether it is on the source or the target curve, the tangent vector, $\vec{P}_k$ k=i or j, can be determined as, $$\vec{P}_k = \frac{P_{k+1} - P_{k-1}}{\|P_{k+1} - P_{k-1}\|}. \tag{22}$$

The correspondence can be calculated by minimizing a cost function that is defined as a function of angle cost and parameter cost. The angle cost at a certain curve point can be defined as, $$\text{angle}(P_k) = \frac{1}{2}\arccos(\vec{P}_{k-1} \cdot \vec{P}_{k+1})\text{sgn}(Z(\vec{P}_{k+1}, \vec{P}_{k-1})); \tag{23}$$

where Z is defined as, $$Z(\overline{X}, \overline{Y}) = X_x Y_y - Y_y Y_x \tag{24}$$

and the sign function, sgn(x), is defined as, $$\text{sgn}(x) = \begin{cases} 1 & x \geq 0 \\ -1 & x < 0 \end{cases}. \tag{25}$$

The parameter cost at point $P_i^S$ is defined as i/n, and consequently the parameter cost at point $P_j^T$ as j/m. Using these definitions, the cost function can be defined as follows:

$$\text{cost}(i, j) = w_1 |\text{angle}(P_i^S) - \text{angle}(P_j^T)| + w_2 \left|\frac{i}{n} - \frac{j}{m}\right|; \tag{26}$$

where the coefficients, $w_1$ and $w_2$, are weighting factors of the angle similarity and parameter cost. The values of these weighting factors can be obtained experimentally.

Adopting the cost function in Eqn. (26), the following optimization problem to be solved can be established:

$$\min \sum_{i=1}^{n} \text{cost}(i, J(i)). \tag{27}$$

Dynamic programming can be applied to solve this optimization problem.

Referring still to FIG. 7, after the correspondence between the source and the target has been determined, the intermediate shapes between the source and target contour are calculated, as indicated at step 704. By way of example, these intermediate contours can be calculated according to the following equation:

$$A(t) = (1-t)I + tA \tag{28};$$

where A(t) is an affine mapping matrix that transforms the source contour, S, to a contour at the intermediate position, t. In general, this matrix accounts for the rotational and scaling transformations. Optionally, the translation is not included in this matrix because it does not describe a property of the intermediate contours other than their location, which is specified by the position, t, and the previously estimated nerve axis.

The affine mapping matrix, A(t), can be computed by factoring A into rotations (orthogonal matrices) and scale-shear parts with positive scaling components, $$A = R_\alpha D R_\beta = R_\alpha \begin{pmatrix} s_x & 0 \\ 0 & s_y \end{pmatrix} R_\beta \text{ with } s_x > 0 \text{ and } s_y > 0. \tag{29}$$

The decomposition can be deduced from the singular value decomposition as follows:

$$\begin{aligned} A &= R_\alpha D R_\beta \\ &= R_\alpha (R_\beta R_\beta^T) D R_\beta \\ &= (R_\alpha R_\beta)(R_\beta^T D R_\beta) \\ &= R_\gamma S \\ &= R_\gamma \begin{pmatrix} s_x & s_h \\ s_h & s_y \end{pmatrix}. \end{aligned} \tag{30}$$

Based on Eqn. (29), A(t) can be computed by linearly interpolating the free parameters in the factorizations, $$A_{\alpha\beta}(t) = ((1-t)I + tD)R_{t\beta} \tag{31}$$

and respectively, $$A_\gamma(t) = T_{t\gamma}((1-t)I + tS) \tag{32}.$$

Thus, an interpolation between two contours can be performed to generate the planar shapes corresponding to the nerve surface contours in-between the two input contours. This interpolation may be performed using the cubic spline algorithm fitting into the newly generated points, $P_i(t)$ computed as described above. This process results in the generation of intermediate nerve contours defined by the interpolated feature points.

The intermediate nerve contours are then distributed, as indicated at step 706. For instance, the intermediate nerve contours are distributed such that their center-of-mass lies on the nerve axis estimated earlier. Then, as indicated at step 708, the intermediate shapes can be adjusted so they best approximate the actual nerve contour depicted in the image volume at the corresponding cross-sectional plane. This adjustment can be performed using an active contouring technique. As one example, this adjustment can be performed using the algorithm described by E. Zadicario, et al., in "Boundary snapping for robust image cutouts," *IEEE Conference on Computer Vision and Pattern Recognition*, 2008; pp. 1-8.

The user can manually adjust the position of each of the points on the contours of the manually segmented slices as well as automatically generated contours using the active contour method. After moving some of the control points, the contour of the edited curve will be recomputed and the active morphing step applied between the edited shape and the two neighboring contours.

Referring again to FIG. 1, after the volume of the nerve has been estimated by interpolating between the estimated nerve contours, the generated nerve volume is outputted, as indicated at step 120. By way of example, the nerve volume can be output as a volumetric mask that is stored in a memory or data storage, or the nerve volume can be output to a display for viewing by the user.

Figure 8:
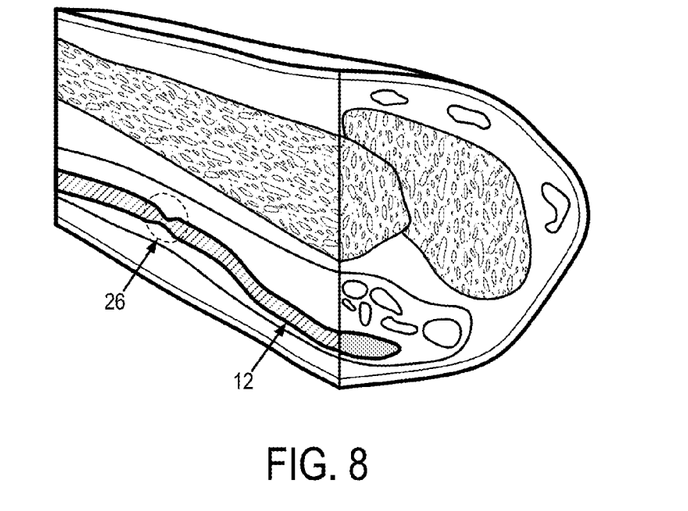
FIG. 8 is a pictorial representation of a magnetic resonance image volume in which a nerve volume has been segmented and selectively displayed with a portion of the surrounding anatomical features.

Advantageously, when the nerve volume has been created, the surrounding anatomy depicted in the image volume can be superimposed or selectively removed from a display to show the nerve in relation to the surrounding overlying anatomy, or alone, in varying degrees. An example of this is illustrated in FIG. 8 where the anatomy surrounding the nerve 12, as segmented by the method of the present invention, has been partially removed to provide a view of the longitudinal extent of the nerve 12 in the image volume. This display has the benefit of allowing a clinician to view the nerve 12 in its relation to the surrounding anatomy to better identify problematic regions, such as region 26, that may cause impingement of the nerve 12. As such, the method of the present invention can provide unique information about the nerve and its surrounding anatomy that can improve surgical planning and guidance, as well as other treatment and diagnostic procedures. For instance, the segmented nerve volume computed in accordance with the present invention can be provided to improve the accuracy of an image-guided surgery procedure, including those that implement an image-guided robotic surgery system. As another feature, the nerve volume can be overlaid on the image volume and colored to highlight the nerve.

Figure 10:
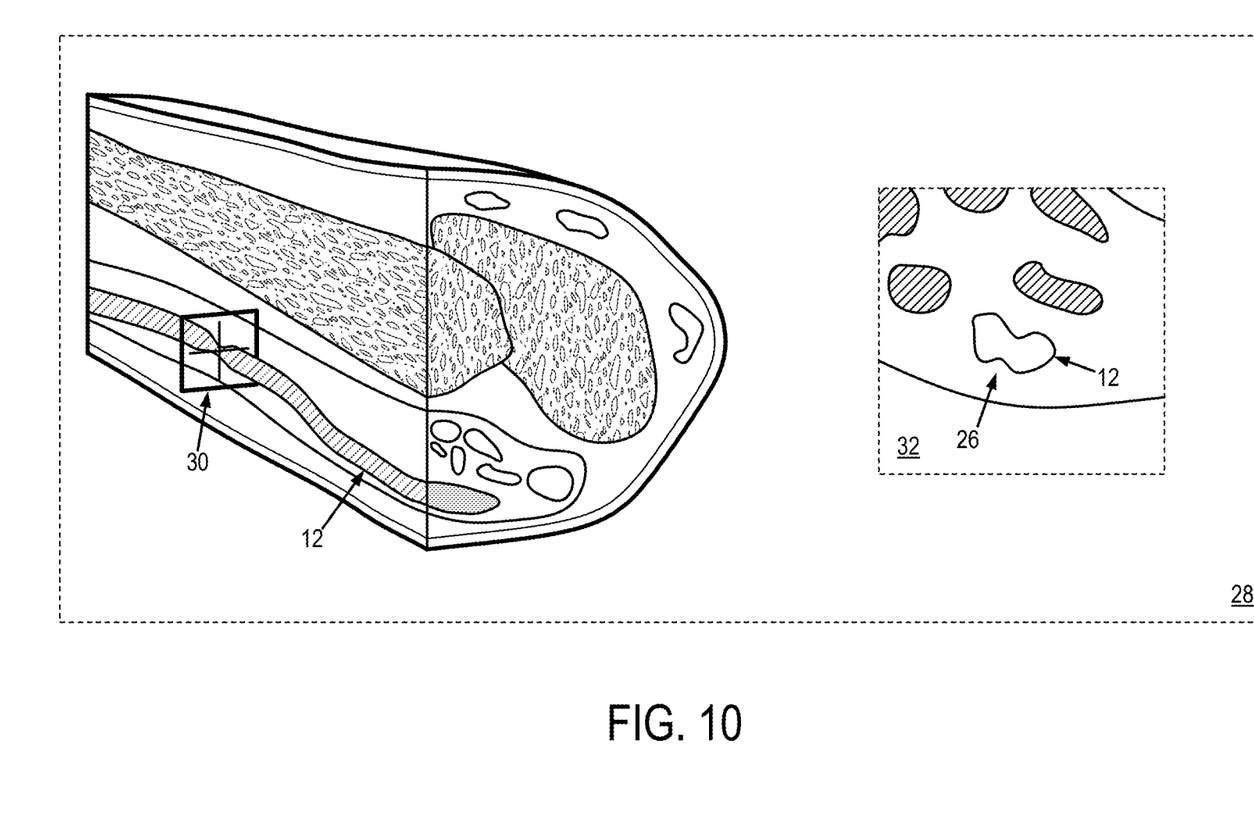
FIG. 10 is a pictorial representation of a magnetic resonance image volume in which a nerve volume has been segmented and selectively displayed with a portion of the surrounding anatomical features, and on which a planar indication of a localizer associated with an arbitrary view through the image volume is displayed.

In some embodiments, such as in the example illustrated in FIG. 10, a display 28 of both the nerve volume and a cross-sectional image 30 from the image volume can be provided. Overlaid on the nerve volume is a planar indication 32 that is associated with the view of the cross-sectional image 30. This planar indication can be normal to the nerve 12, or can be oriented at an arbitrary angle relative to the nerve axis. A discussion of generating such arbitrary views is provided above. With this display 28, the user is able to identify regions-of-interest in the nerve volume and then navigate the planar indication 32 to a region-of-interest so a cross-section of that region can be simultaneously viewed with the nerve volume. In some embodiments, more than one planar indication can be provided for simultaneously displaying multiple different views through the nerve volume. This display can be advantageous for rapidly identifying stenotic regions 26 in the nerve and then visualizing one or more cross-sectional views of that stenotic region 26.

In some embodiments, regions-of-interest, such as stenotic regions, can be highlighted. For example, if a region of the nerve volume has a diameter that is outside of a range of expected values, the voxels associated with this troubled region can be highlighted when displaying the nerve volume. Using this display, trouble regions of the nerve can be rapidly, and reliably identified and presented to the user.

At all times, snapshots of the displays can be taken and saved into an image library for that study, later to be used for an embedded report writer, or to be sent as stand alone for the patient of clinician.

Figure 9:
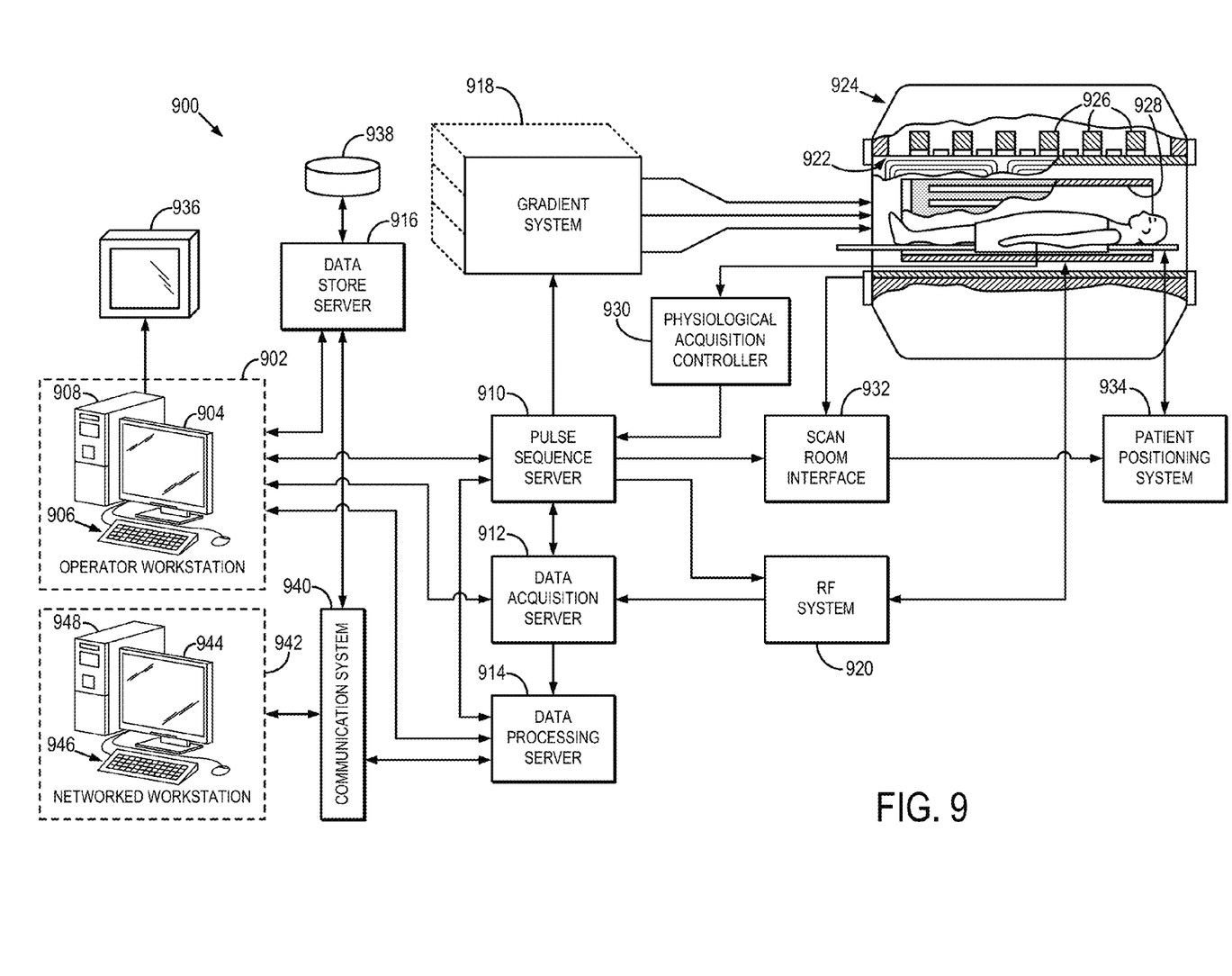
FIG. 9 is a block diagram of an example of an MRI system.

Referring particularly now to FIG. 9, an example of a magnetic resonance imaging ("MRI") system 900 is illustrated. The MRI system 900 includes a workstation 902 having a display 904 and a keyboard 906. The workstation 902 includes a processor 908, such as a commercially available programmable machine running a commercially available operating system. The workstation 902 provides the operator interface that enables scan prescriptions to be entered into the MRI system 900. The workstation 902 is coupled to four servers: a pulse sequence server 910; a data acquisition server 912; a data processing server 914; and a data store server 916. The workstation 902 and each server 910, 912, 914, and 916 are connected to communicate with each other.

The pulse sequence server 910 functions in response to instructions downloaded from the workstation 902 to operate a gradient system 918 and a radiofrequency ("RF") system 920. Gradient waveforms necessary to perform the prescribed scan are produced and applied to the gradient system 918, which excites gradient coils in an assembly 922 to produce the magnetic field gradients $G_x$, $G_y$, and $G_z$ used for position encoding MR signals. The gradient coil assembly 922 forms part of a magnet assembly 924 that includes a polarizing magnet 926 and a whole-body RF coil 928.

RF excitation waveforms are applied to the RF coil 928, or a separate local coil (not shown in FIG. 9), by the RF system 920 to perform the prescribed magnetic resonance pulse sequence. Responsive MR signals detected by the RF coil 928, or a separate local coil (not shown in FIG. 9), are received by the RF system 920, amplified, demodulated, filtered, and digitized under direction of commands produced by the pulse sequence server 910. The RF system 920 includes an RF transmitter for producing a wide variety of RF pulses used in MR pulse sequences. The RF transmitter is responsive to the scan prescription and direction from the pulse sequence server 910 to produce RF pulses of the desired frequency, phase, and pulse amplitude waveform. The generated RF pulses may be applied to the whole body RF coil 928 or to one or more local coils or coil arrays (not shown in FIG. 9).

The RF system 920 also includes one or more RF receiver channels. Each RF receiver channel includes an RF preamplifier that amplifies the MR signal received by the coil 928 to which it is connected, and a detector that detects and digitizes the I and Q quadrature components of the received MR signal. The magnitude of the received MR signal may thus be determined at any sampled point by the square root of the sum of the squares of the I and Q components:

$$M = \sqrt{I^2 + Q^2} \qquad (33);$$

and the phase of the received MR signal may also be determined:

$$\varphi = \tan^{-1}\left(\frac{Q}{I}\right). \qquad (34)$$

The pulse sequence server 910 also optionally receives patient data from a physiological acquisition controller 930. The controller 930 receives signals from a number of different sensors connected to the patient, such as electrocardiograph ("ECG") signals from electrodes, or respiratory signals from a bellows or other respiratory monitoring device. Such signals are typically used by the pulse sequence server 910 to synchronize, or "gate," the performance of the scan with the subject's heart beat or respiration.

The pulse sequence server 910 also connects to a scan room interface circuit 932 that receives signals from various sensors associated with the condition of the patient and the magnet system. It is also through the scan room interface circuit 932 that a patient positioning system 934 receives commands to move the patient to desired positions during the scan.

The digitized MR signal samples produced by the RF system 920 are received by the data acquisition server 912. The data acquisition server 912 operates in response to instructions downloaded from the workstation 902 to receive the real-time MR data and provide buffer storage, such that no data is lost by data overrun. In some scans, the data acquisition server 912 does little more than pass the acquired MR data to the data processor server 914. However, in scans that require information derived from acquired MR data to control the further performance of the scan, the data acquisition server 912 is programmed to produce such information and convey it to the pulse sequence server 910. For example, during prescans, MR data is acquired and used to calibrate the pulse sequence performed by the pulse sequence server 910. Also, navigator signals may be acquired during a scan and used to adjust the operating parameters of the RF system 920 or the gradient system 918, or to control the view order in which k-space is sampled. In all these examples, the data acquisition server 912 acquires MR data and processes it in real-time to produce information that is used to control the scan.

The data processing server 914 receives MR data from the data acquisition server 912 and processes it in accordance with instructions downloaded from the workstation 902. Such processing may include, for example: Fourier transformation of raw k-space MR data to produce two or three-dimensional images; the application of filters to a reconstructed image; the performance of a backprojection image reconstruction of acquired MR data; the generation of functional MR images; and the calculation of motion or flow images.

Images reconstructed by the data processing server 914 are conveyed back to the workstation 902 where they are stored. Real-time images are stored in a data base memory cache (not shown in FIG. 9), from which they may be output to operator display 912 or a display 936 that is located near the magnet assembly 924 for use by attending physicians. Batch mode images or selected real time images are stored in a host database on disc storage 938. When such images have been reconstructed and transferred to storage, the data processing server 914 notifies the data store server 916 on the workstation 902. The workstation 902 may be used by an operator to archive the images, produce films, or send the images via a network to other facilities.

The present invention has been described in terms of one or more preferred embodiments, and it should be appreciated that many equivalents, alternatives, variations, and modifications, aside from those expressly stated, are possible and within the scope of the invention.

The invention claimed is:

1. A method for segmenting a nerve in a three-dimensional image volume obtained with a magnetic resonance imaging (MRI) system, the steps of the method comprising:
    a) providing a three-dimensional image volume that depicts a nerve and surrounding anatomical structures in a series of contiguous image slices obtained with an MRI system;
    b) selecting at least one control point in the image volume, wherein the at least one control point is an initial estimate of a point lying on an axis of the nerve;
    c) generating an axis that extends from the at least one control point along a longitudinal direction through the nerve, thereby defining the axis of the nerve;
    d) forming at least two cross sections, each cross section defining a cross-sectional area of the nerve in a plane perpendicular to the generated axis of the nerve; and
    e) generating additional cross sections between the at least two cross sections formed in step d), thereby forming a volume that defines the nerve segmented from the surrounding anatomical structures.

2. A method for segmenting a nerve in a three-dimensional image volume obtained with a magnetic resonance imaging (MRI) system, the steps of the method comprising:
    a) providing a three-dimensional image volume that depicts a nerve and surrounding anatomical structures;
    b) selecting at least one control point in the image volume as a point that is associated with the nerve, wherein the at least one control point is an initial estimate of a point lying on a nerve axis that extends along an axis of extension of the nerve;
    c) generating a three-dimensional volume corresponding to the nerve by propagating the three-dimensional volume outward from the selected at least one control point and through the image volume; and d) displaying the generated three-dimensional volume corresponding to the nerve while selectively displaying the surrounding anatomical structures.

3. The method as recited in claim 2 in which selectively displaying the surrounding anatomical structures in step d) includes at least one of selectively removing the surrounding anatomical structures, completely removing the surrounding anatomical features, and selectively changing an opacity of the surrounding anatomical structures.

4. The method as recited in claim 2 in which step c) includes estimating the nerve axis that extends from the selected control point along an axis of extension of the nerve.

5. The method as recited in claim 4 in which step b) includes selecting at least two control points in the image volume that are associated with the nerve, and in which step c) includes estimating a nerve axis that extends from one of the selected control points along an axis of extension of the nerve to another of the selected control points.

6. The method as recited in claim 5 in which step c) includes estimating the nerve axis by performing a spline interpolation between the selected at least two control points.

7. The method as recited in claim 4 in which step c) further includes estimating a plurality of cross-sectional planes that are perpendicular to the estimated nerve axis.

8. The method as recited in claim 7 in which step c) includes estimating feature points associated with a surface of the nerve in each of the cross-sectional planes.

9. The method as recited in claim 8 in which step c) includes interpolating a surface of the nerve between feature points in adjacent cross-sectional planes.

10. The method as recited in claim 7 in which step c) includes estimating a surface of the three-dimensional volume by:
   calculating a median value within a sub-region of each cross-sectional plane;
   selecting pixels in each cross-sectional plane that are within a specified distance of the nerve axis and that have an image intensity value within a specified range of the calculated median value for that cross-sectional plane; and
   computing a curve that bounds the selected pixels.

11. The method as recited in claim 2 in which step d) includes displaying a two-dimensional cross-sectional image of the nerve together with the three-dimensional volume corresponding to the nerve.

12. The method as recited in claim 11 in which the two-dimensional cross-sectional image is defined by an arbitrary view computed from a cross section of the generated three-dimensional volume corresponding to the nerve.

13. The method as recited in claim 2 in which step d) includes selectively displaying portions of the three-dimensional volume corresponding to the nerve differently than other portions of the three-dimensional volume corresponding to the nerve.

14. The method as recited in claim 13 in which selectively displaying portions of the three-dimensional volume corresponding to the nerve includes identifying abnormal regions in the three-dimensional volume using a distance threshold and selectively displaying the identified abnormal regions.

15. A method for segmenting a nerve in a three-dimensional image volume obtained with a magnetic resonance imaging (MRI) system, the steps of the method comprising:
   a) providing a three-dimensional image volume that depicts a nerve and surrounding anatomical structures;
   b) selecting at least one control point in the image volume as a point that is associated with the nerve;
   c) generating a three-dimensional volume corresponding to the nerve by propagating the three-dimensional volume outward from the selected at least one control point and through the image volume, wherein a surface of the three-dimensional volume is estimated by:
      calculating a median value within a sub-region of the three-dimensional volume;
      selecting pixels in the three-dimensional volume that are within a specified distance of the selected at least one control point and that have an image intensity value within a specified range of the calculated median value; and
      computing a curve that bounds the selected pixels; and
   d) displaying the generated three-dimensional volume corresponding to the nerve while selectively displaying the surrounding anatomical structures; and
   wherein step c) further includes;
      estimating a nerve axis that extends from the selected control point along an axis of extension of the nerve; and
      estimating a plurality of cross-sectional planes that are perpendicular to the estimated nerve axis.

* * * * *